United States Patent
Aksamit et al.

(10) Patent No.: US 7,268,491 B2
(45) Date of Patent: Sep. 11, 2007

(54) EXPANDABLE DISPLAY HAVING ROLLABLE MATERIAL

(75) Inventors: Slavek P. Aksamit, Durham, NC (US); Cristian Medina, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/012,601

(22) Filed: Dec. 14, 2004

(65) Prior Publication Data

US 2006/0125391 A1    Jun. 15, 2006

(51) Int. Cl.
*H01J 1/62* (2006.01)
*G09F 13/20* (2006.01)

(52) U.S. Cl. .......................... 313/511; 40/542
(58) Field of Classification Search ............... 313/511; 283/83, 84; 40/542–544; 362/189
See application file for complete search history.

(56) References Cited

U.S. PATENT DOCUMENTS 4,103,171 A * 7/1978 Schroeder ............... 250/458.1
5,469,020 A * 11/1995 Herrick ........................ 313/511
2002/0074937 A1 * 6/2002 Guberman et al. .......... 313/511
2004/0087066 A1   5/2004 Voutsas ........................ 438/147
2004/0093778 A1 * 5/2004 Asvadi ........................ 40/544

FOREIGN PATENT DOCUMENTS

JP    11-109880    4/1999

OTHER PUBLICATIONS www.nokia.com/nokia/0,,42794,00.html.

* cited by examiner

*Primary Examiner*—Joseph Williams
*Assistant Examiner*—Bumsuk Won
(74) *Attorney, Agent, or Firm*—Sawyer Law Group LLP

(57) ABSTRACT

A display is disclosed. The display comprises a plurality of expandable tubes and a rollable material coupled to the expandable tubes, wherein the plurality of tubes can be expanded and contracted to increase or decrease the size of the display. The user of the expandable display in accordance with the present invention would have the benefit of having a much larger display to work with, and still be able to shrink it for ease of transportation. An added benefit to the user is that the color intensity of such a design is significantly higher than that of current LCD displays. Such displays also have the benefit of not requiring backlighting to operate.

13 Claims, 5 Drawing Sheets

100

102

EXPANDABLE DISPLAY HAVING ROLLABLE MATERIAL

FIELD OF THE INVENTION

The present invention relates generally to computers and more particularly to displays utilized in computers.

BACKGROUND OF THE INVENTION

Due to current size constraints of laptops, notebooks, PDAs and the like, their screens have a limited viewing area. In addition, many other larger screens have the same constraints. The small screens on these computing systems would be much more useful to users if the physical viewing area of the display could be changed to accommodate the needs of the users. A system for changing the viewing area must be easily implemented and adapted to existing computer systems. In addition, the system should be cost-effective. The present invention addresses such a need.

SUMMARY OF THE INVENTION

A display is disclosed. The display comprises a plurality of expandable tubes and a rollable material coupled to the expandable tubes, wherein the plurality of tubes can be expanded and contracted to increase or decrease the size of the display.

The user of the expandable display in accordance with the present invention would have the benefit of having a much larger display to work with, and still be able to shrink it for ease of transportation. An added benefit to the user is that the color intensity of such a design is significantly higher than that of current LCD displays. Such displays also have the benefit of not requiring backlighting to operate.

DETAILED DESCRIPTION

The present invention relates generally to computers and more particularly to displays utilized in computers. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Utilizing a computer display in accordance with the present invention, a user would be able to open his/her computer (Thinkpad, for example), and while using it, be able to easily stretch out the actual display to gain additional display area. The actual physical size of the display would increase. For example, a user could hold the sides of a regular 14" Thinkpad, then would stretch the sides out to 20" or more. The limit to the expandability of the display would be determined by the designer's implementation.

The user of the expandable display in accordance with the present invention would have the benefit of having a much larger display to work with, and still be able to shrink it for ease of transportation. An added benefit to the user is that the color intensity of such a design is significantly higher than that of current LCD displays. Such displays also have the benefit of not requiring backlighting to work.

To provide this feature, the display itself must be flexible enough, so that the sides can be rolled up. The active display size would always be the area that is unrolled, although the entire surface is a single piece of material. The screen itself can be made of organic light emitting diodes (OLEDs) or light emitting polymers (LEPs), which are proven to work on flexible materials, and are much lower in power consumption than conventional display designs. To describe the features of the present invention in more detail refer now to the following description in conjunction with the accompanying drawings.

Figure 1:
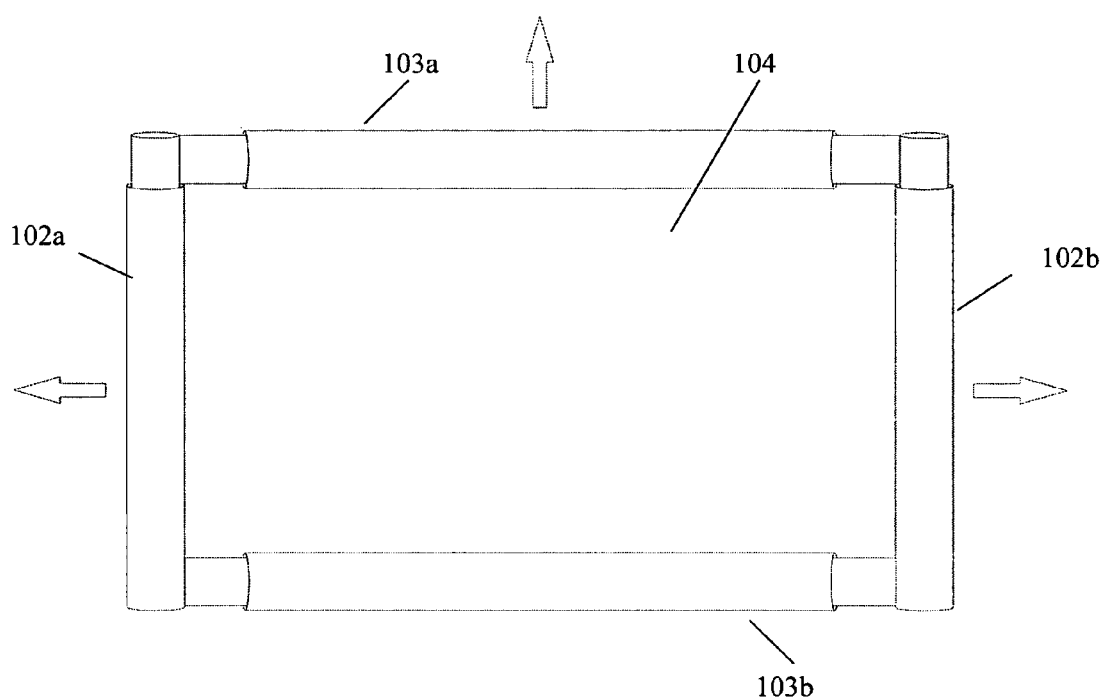
FIG. 1 is a view of the fully assembled display.

FIG. 1 is a view of the fully assembled display 100, with the arrows indicating that the actual sides of the display are able to slide out to make the actual size of the display change. It shows two expandable vertical tubes 102a and 102b and two expandable horizontal tubes 103a and 103b that allow the display 100 to increase in size both vertically and horizontally. In this embodiment, the display is rectangular but one of ordinary in the art readily recognizes that the display can be of any configuration and they would be within the spirit and scope of the present invention.

Initially the display would have a minimum dimension, which could be increased according to the user's needs. The horizontal tubes (long frame sides) are really three different components. Two of the components (parts of tube adjacent to the vertical sides, near comers) fit into a centrally placed tube. This way, when the horizontal size of the display increases, the tube components slide out of the central tube, while still preserving the structural integrity of the display.

In the display as shown in FIG. 1, the sides and top could be expanded or contracted in size independently. However, depending upon the implementation, the sides and the top could also be expanded and contracted in size in unison, thereby preserving the initial ratio between the side and top size (up to a certain predetermined maximum). The resizing could be accomplished via manual pull action on the comers of display, or additional hardware could be used to automatically slide the edges to desired size (for example, stepper motors could be utilized to automatically expand and contract the sides and top of the display).

The "rollable" part of the display 104 would be exposed if a user manually pulled on the sides, causing the material of the display to unroll. Side guides would slide the frame of the display out, and the rolled material would then unwind to expand the physical size of the display.

When a user desires to shrink the size of the display, they simply push on the sides of the display, causing the frame to slide in, rolling up the display at both ends, thus decreasing the size of the display to the preferred dimensions. Similarly, the sides, top and bottom of the display can be pulled out to provide for the expanded display.

Figure 2:
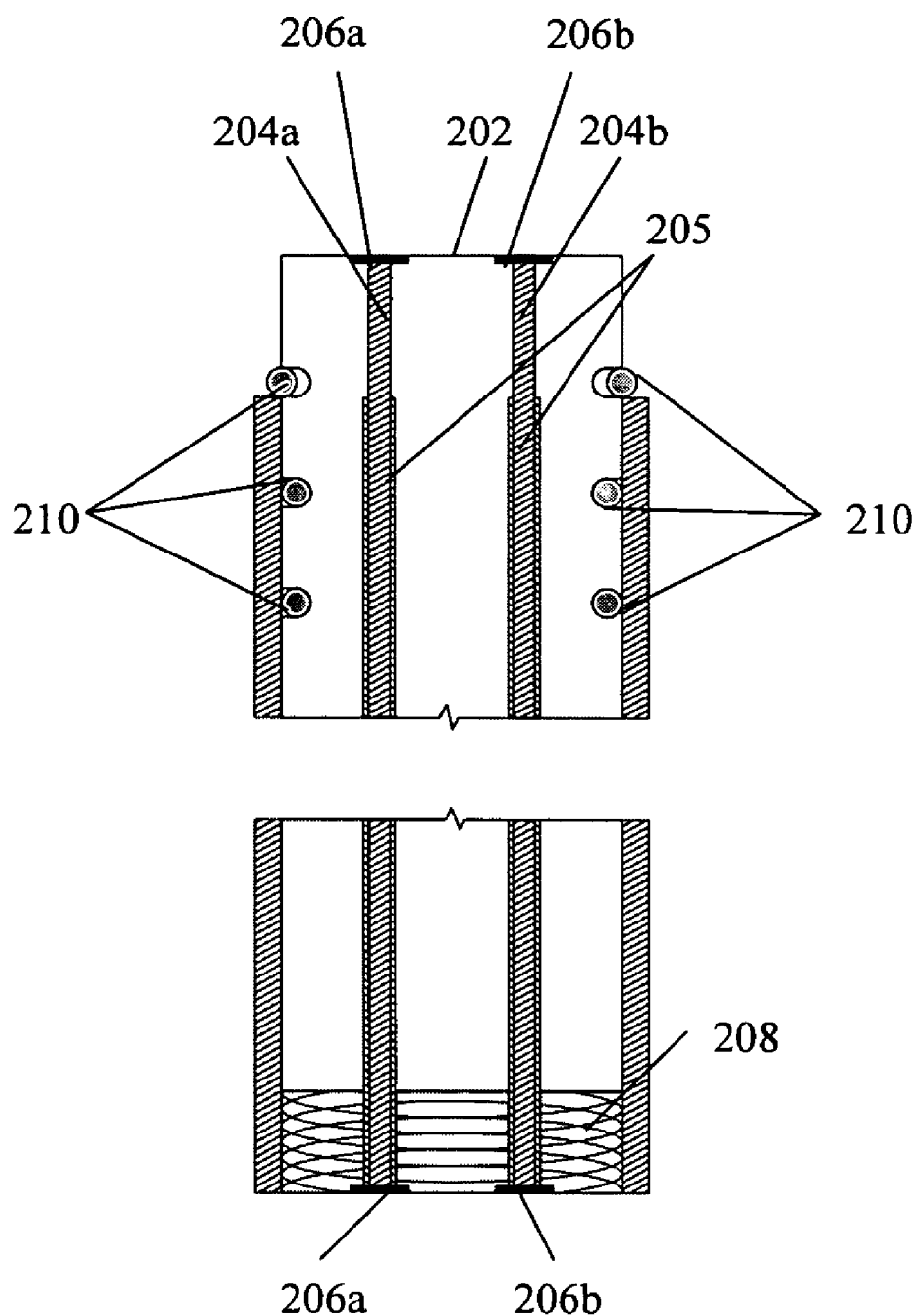
FIG. 2 shows the inside of the vertical tubes that allows vertical expansion.

FIG. 2 shows the inside of the vertical tubes 102 that allow vertical expansion. The tubes 102a and 102b include a tube 202.

The tube 202 comprises a central tube structure. That central tube structure is where the smaller sized edges slide in and out of (those edges are affixed to the horizontal sides of the display). The round balls 210 represent contact points for sensing the increments of expandability for the sides. The contact points 210 can be of a variety of types of sensors such as contact sensors, infrared sensors that read lines in the tube to indicate how far the tube has moved, or the like. Accordingly, a variety of sensors could be utilized and they would be within the spirit and scope of the present invention.

In this illustration, the inner rods 204a and 204b are used to roll the actual display material around. Those rods are telescopic and they expand/contract in unison with the vertical edges of the display. Each rod 204 has the material 205 affixed to it in such a way, that when the vertical size of the display is enlarged, the front layer of display material travels upwards with the top edge of the display, while the bottom rear layer of display material remains stationary. The coil-like structure in FIG. 2 is a spring mechanism 208 that makes it easier for one to push out the display to enlarge it.

Figure 3:
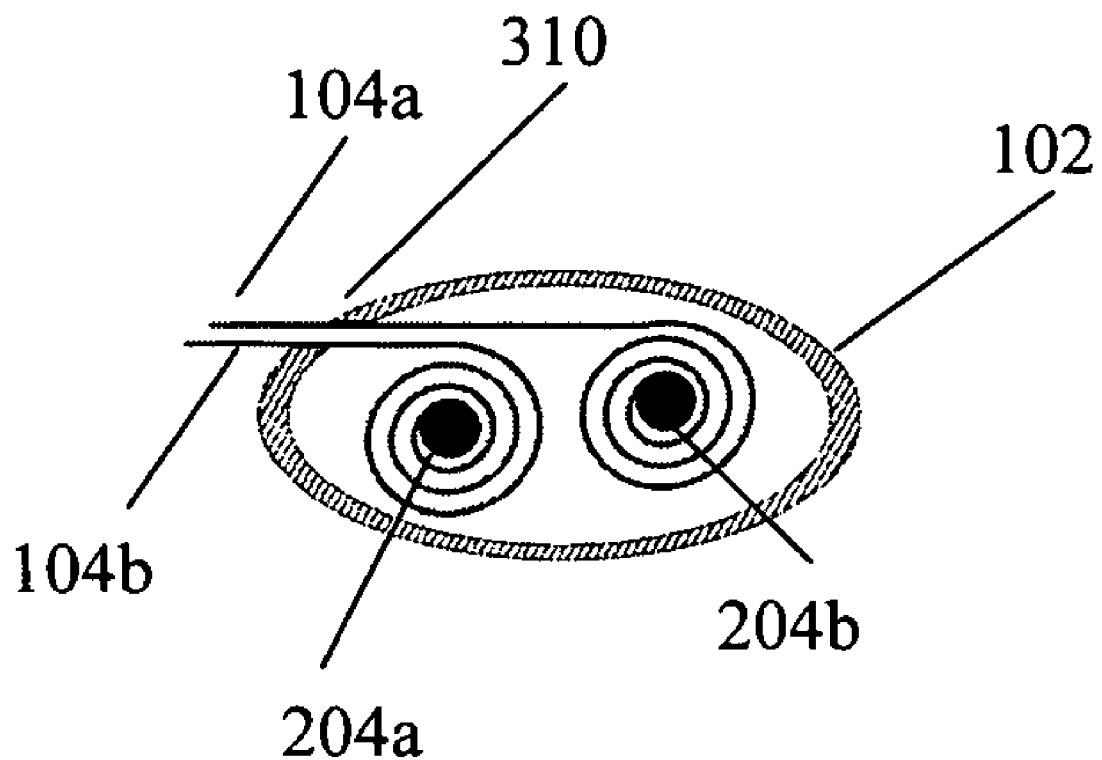
FIG. 3 is the top view of the inside of one of the vertical tubes.

FIG. 3 is the top view of the inside of one of the vertical tubes 102. The OLED or LEP material 104a and 104b is rolled around telescopic rods 204a' and 204b' and comes out of the tube 102 through an opening 310 on the side. The rods 204a' and 204b' in this embodiment are offset from each other in their positioning to allow a minimal distance between the display material 104a and 104b and avoid friction.

The dark circles inside are the telescopic rods 204a and 204b that have the display material wrapped around it. The two layers of display material 104a and 104b exit the vertical edge on one side (this particular view is of the right vertical side). When enlarging, the display material 104a and 104b uncoils from the rods. When reducing size, the display material 104a and 104b gets coiled around each rod (rear display material on one rod 204a, while the front display material is coiled on the other rod 204b).

Figure 4:
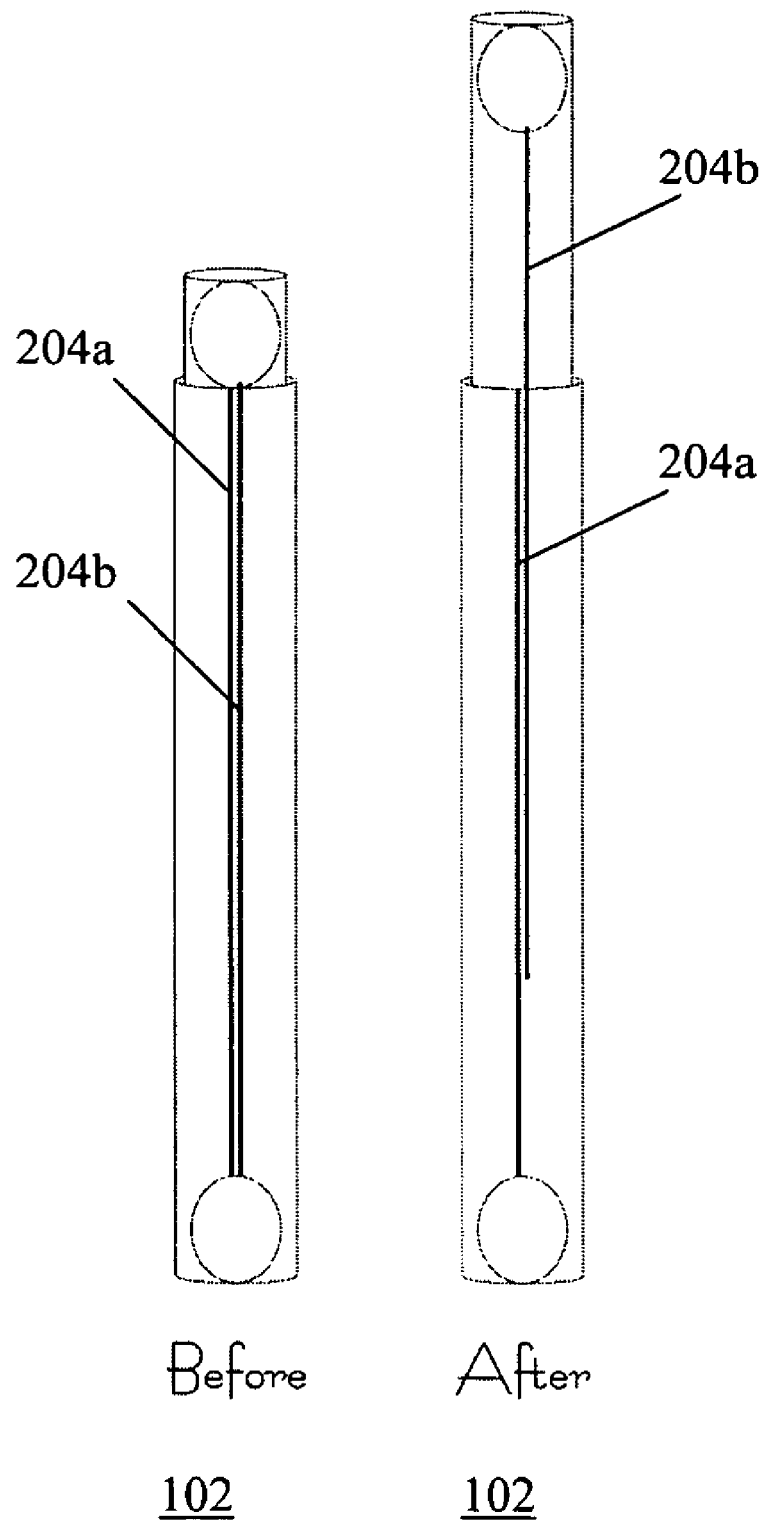
FIG. 4 shows the "before expansion" and "after expansion" views of a horizonal tube.

FIG. 4 shows 'before expansion' and 'after expansion' views of a vertical tube 103. The first side view in FIG. 4 shows the central piece 402 and the piece 404 that slides into it before expansion. The thin dark lines are the telescopic rods 406a and 406b.

The second side view in FIG. 4 shows the horizontal side expanded. The rods 406a and 406b with display material are expanded as well. The horizontal movement of the sides uncoils the material from the rods making the display vertically larger, while the sliding of the top edge in the upward direction enlarges the physical size of the display in the vertical direction. Although in this embodiment the vertical tubes contain the rollable material, and the horizontal tubes attach to the vertical tubes for expandability, it is also possible that in another embodiment (not shown) the horizontal tubes would contain the rollable material, and the vertical tubes would attach to the horizontal tubes for expandability.

Figure 5:
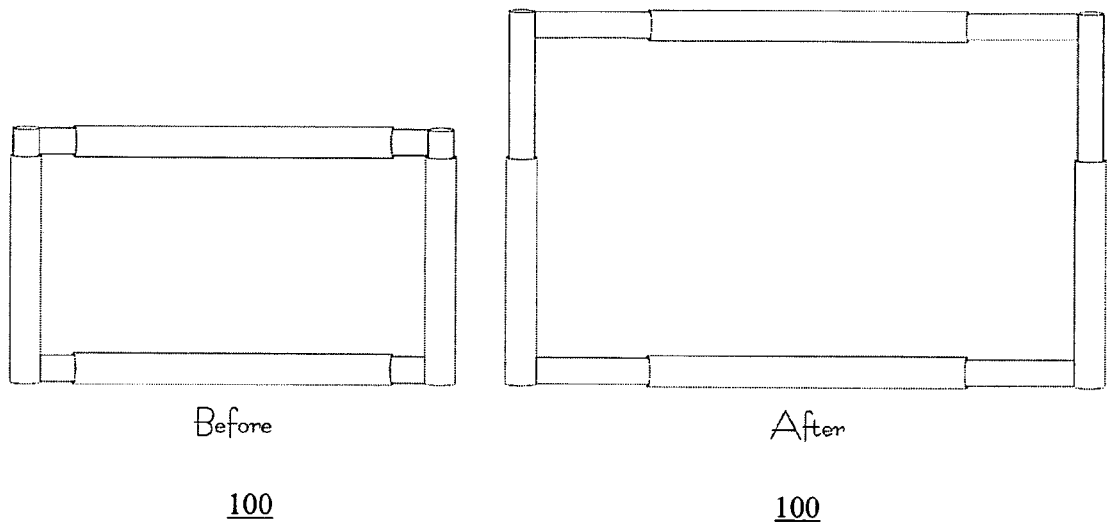
FIG. 5 shows "before expansion" and "after expansion" views of the display.

FIG. 5 shows 'before expansion' and 'after expansion' views of the display 102. In this figure, the sliding components of the edges are clearly seen. The right view shows the expanded external components.

In one embodiment, the computer can detect which display size is being used to display images. This can be accomplished by having the designer pre-determine the expansion/contraction increments. Expansion/contraction increments are mechanisms that monitor how much of the display was rolled out/in. Software within the computer could, for example, monitor the adjustments in size and adjust the display automatically.

Another simpler and less costly possibility is to not to involve the computer in detecting the display size. In this case, the user would manually make the changes so that the displayed image fits the display size desired. The display size can also be changed in the vertical direction. This solution would have two layers of the display. One layer would adjust the x-axis and y-axis. The second layer would adjust the x-axis. To ensure that the display is of the correct geometry (rectangular), each side roll would hold both layers. When the top edge of the display is expanded, the side roll can expand vertically, thus sliding the two layers apart.

Many other improvements can ease the adjustment process in accordance with the present invention, such as the utilization of automatic expand/shrink with small stepper motors that activate upon a press of a button, etc. The present invention is not intended to be only for portable computers. The present invention is meant to be utilized within any display, where enlarging the viewable area physically is desired. The expandable/shrinkable computer display in accordance with the present invention can be incorporated in various environments, wherever there is a need to utilize computer displays.

Although the present invention has been described in accordance with the embodiments shown, one of ordinary skill in the art will readily recognize that there could be variations to the embodiments and those variations would be within the spirit and scope of the present invention.

For example, this is one of the embodiments of the design. It is not necessarily restricted to following these diagrams. The pictures depict a "manual" version of the unit that would expand and contract by the user pulling on the display. But this can also be accomplished with an automated method that uses stepper motors or similar electronic parts to push the top of the display up and the sides out. Accordingly, many variations of the disclosed embodiments can be utilized including but not limited to manual or automatic scrolling, manual, software or hardware resolutions in conjunction with the display. Accordingly, many modifications may be made by one of ordinary skill in the art without departing from the spirit and scope of the appended claims.

What is claimed is:

1. A display comprising:
   a plurality of expandable tubes, wherein the plurality of expandable tubes comprises two expandable vertical tubes and two expandable horizontal tubes, wherein the two vertical tubes allow the display to increase/decrease in size in the horizontal direction and the two horizontal tubes allow the display to increase/decrease in size in the vertical direction; and
   a rollable material coupled to at least a portion of the plurality of expandable tubes, wherein the plurality of tubes can be expanded and contracted to increase or decrease the size of the display.

2. The display of claim 1, wherein the rollable material comprises an organic light emitting diode (OLED) material.

3. The display of claim 1, wherein the rollable material comprises light emitting polymer (LEP) material.

4. The display of claim 1, wherein the two expandable vertical tubes and two expandable horizontal tubes operate independently to allow for increase/decrease in size of the display.

5. The display of claim 1, wherein the rollable material is also within two of the plurality of expandable tubes.

6. The display of claim 5, wherein each of the two plurality of expandable tubes comprises a central tube structure, telescoping rods within the central tube structure for the expansion and contraction of the expandable tubes, wherein rollable material is affixed to each of the telescoping rods such that when the size of the display is enlarged, a first layer of the rollable material on one of the two rods travels upwardly with the edge of the display and a second layer of the rollable material on the other of the two rods remains stationary.

7. The display of claim 6, wherein the two rods are offset from each other to avoid friction of the rollable material.

8. The display of claim 7, wherein there are a plurality of sensors on the central tube structure to sense the increments of expandability.

9. A display comprising:
   two expandable vertical tubes and two expandable horizontal tubes, wherein the two vertical tubes allow the display to increase/decrease in size in the vertical direction; wherein the two expandable vertical tubes and two expandable horizontal tubes operate independently to allow for increase/decrease in size of the display; wherein each of the two plurality of expandable vertical tubes comprises a central tube structure, telescoping rods within the central tube structure for the expansion and contraction of the expandable tube, wherein the two rods are offset from each other to avoid friction of the rollable material; wherein there are a plurality of sensors on the central tube structure to sense the increments of expandability; and
   a rollable material couple to at least a portion of the plurality of expandable tubes, wherein the plurality of tubes can be expanded and contracted to increase or decrease the size of the display, wherein rollable material is affixed to each of the telescoping rods such that when the size of the display is enlarged, a first layer of the rollable material on one of the two rods travels upwardly with the edge of the display and a second layer of the rollable material on the other of the two rods remains stationary.

10. The display of claim 9, wherein the plurality of sensors are contact sensors.

11. The display of claim 9, wherein the plurality of sensors are infrared sensors.

12. A display comprising:
   a plurality of expandable tubes, the plurality of expandable tubes including two expandable vertical tubes and two expandable horizontal tubes, wherein the plurality of expandable tubes operate independently to allow for increase/decrease in size of the display; and
   a rollable material coupled to at least a portion of the plurality of expandable tubes, wherein the plurality of tubes can be expanded and contracted to increase or decrease the size of the display.

13. A display comprising:
   a plurality of tubes, and
   a rollable material coupled to at least a portion of the plurality of tubes, wherein the plurality of tubes can be expanded and contracted to increase or decrease the size of the display, wherein the rollable material is also within two of the plurality of expandable tubes and wherein two of the plurality of expandable tubes comprises a central tube structure, telescoping rods within the central tube structure for the expansion and contraction of the expandable tubes, wherein the rollable material is affixed to each of the telescoping rods such that when the size of the display is enlarged, a first layer of the rollable material on one of the two rods travels upwardly with the edge of the display and a second layer of the rollable material on the other of the two rods remains stationary.

* * * * *